United States Patent [19]
DeMarsh et al.

[11] Patent Number: 5,479,961
[45] Date of Patent: Jan. 2, 1996

[54] METHOD OF PLUGGING A HEAT EXCHANGER TUBE AND PLUG THEREFOR

[75] Inventors: Peter L. DeMarsh, Picayune, Miss.; William W. Crawford, Slidell, La.

[73] Assignee: Senior Engineering Company, Commerce, Calif.

[21] Appl. No.: 352,895

[22] Filed: Dec. 9, 1994

[51] Int. Cl.⁶ ............................................. F16L 55/10
[52] U.S. Cl. .................... 138/97; 138/89; 165/71; 165/76; 29/523
[58] Field of Search .................. 138/89, 97; 165/71, 165/76; 376/203, 204; 29/523

[56] References Cited

U.S. PATENT DOCUMENTS

| | | | |
|---|---|---|---|
| 1,837,345 | 12/1931 | Thomas | 138/89 |
| 3,491,798 | 1/1970 | Beshara | 138/89 |
| 3,590,877 | 7/1971 | Leopold | 138/89 |
| 3,724,062 | 4/1973 | Cantrell et al. | 138/89 |
| 4,502,511 | 3/1985 | Zafred | 138/89 |
| 4,513,786 | 4/1985 | Sodergren et al. | 138/89 |
| 4,976,307 | 12/1990 | Hall et al. | 165/76 |
| 5,022,437 | 6/1991 | Pötz et al. | 138/89 |
| 5,400,827 | 3/1995 | Bäro et al. | 138/97 |

*Primary Examiner*—James E. Bryant, III
*Attorney, Agent, or Firm*—Vaden, Eickenroht, Thompson & Feather

[57] ABSTRACT

A plug for sealing the open end of a tube located in an opening in a tube sheet of a heat exchanger is described along with a method of installing the plug. The plug is comprised of a generally cylindrical metallic body of ductile material that is inserted into the open end of the tube at the tube sheet. The body carries one or more resilient seal rings and has a longitudinally extending blind central opening in the body. A body of pressure transmitting material, such as polyethylene is located in the body and an explosive charge is located in a longitudinally extending central opening in the body of pressure transmitting material. The explosive charge, when detonated, expands the metallic body of the plug and the resilient seal ring into sealing engagement with the tube. A method of plugging a leaky metal tube in a heat exchanger tube bundle and tube sheet structure where the tubes extend through the tube sheet by inserting a metallic plug having an explosive charge inside the plug and a resilient seal on the outside of the plug into the tube and detonating the explosive charge.

4 Claims, 2 Drawing Sheets

5,479,961

METHOD OF PLUGGING A HEAT EXCHANGER TUBE AND PLUG THEREFOR

BACKGROUND OF THE INVENTION

1. Field of the Invention

The present invention relates to a method of plugging the end of a leaking heat exchanger tube and a plug for doing so.

2. Description of the Prior Art

Heat exchanger tubes may develop leaks for many reasons, such as pitting, corrosion, fatigue cracks, steam erosion and other types of damage. Tube leaks reduce heat exchanger efficiency, and when enough tubes develop leaks to seriously effect the operation of the heat exchanger, but not enough to require a replacement of the leaking tubes, the practice is to shut the heat exchanger down long enough to plug the ends of the leaking tubes.

Leaking tubes have been plugged in the past by fusion welding a plug in, or a cap on, the ends of the tube at the tube sheet. This method is extremely cumbersome and time consuming.

Tapered plugs have also been used to seal off heat exchanger tubes. The plugs are inserted into the end of the tube at the tube sheet such that the plug is pressed tightly within the tube. The larger end of the tapered plug remains partially outside of the tube to provide a means for later removing the plug. Such plugs, however, may easily be inserted too far into the tube or with too much force, resulting in damage or "dimpling" of the tube sheet, which creates a major problem.

Explosively expanded plugs for plugging heat exchanger tubes at the juncture of the tube and tube sheet are known in the art. Some are moved into engagement with the tube at a velocity sufficient to weld the plug to the tube. However, the welded plugs cannot be easily removed from the tube ends when it becomes necessary to remove and replace the damaged tubes. See U.S. Pat. Nos. 3,555,656, 3,590,877, 3,785,291, 3,724,062, and 3,919,940.

Other prior art plugs are explosively expanded sufficiently to form a metal-to-metal seal. There is a problem with this type of plug. As the temperature in the heat exchanger varies, the tubes expand and contract, which can cause sufficient relative movement between the plugs and the tubes to break the metal-to-metal seal. See U.S. Pat. No. 3,491,798 for a description of this type plug.

Therefore, it is an object of this invention to provide a metal-to-metal seal type of explosively expanded plug with one or more resilient seal rings that will maintain a pressure-tight seal between the plug and the tube should the metal-to-metal seal be broken due to expansion and contraction of the tube and a method on installing the plug.

It is another object of this invention to provide a plug for sealing the opening in a tube sheet or the open end of a tube located in an opening in a tube sheet with a generally cylindrical metallic body of ductile material for positioning in the open end of the tube with a resilient seal ring and an explosive charge in a longitudinal opening in the body, that when detonated expands the body and the seal ring into sealing engagement with the tube sheet or with the tube to plug the end of the tube.

These and other objects, advantages, and features of this invention will be apparent to those skilled in the art from a reading this specification including the attached drawings and appended claims.

DESCRIPTION OF THE PREFERRED EMBODIMENTS OF THE INVENTION

Figure 1:
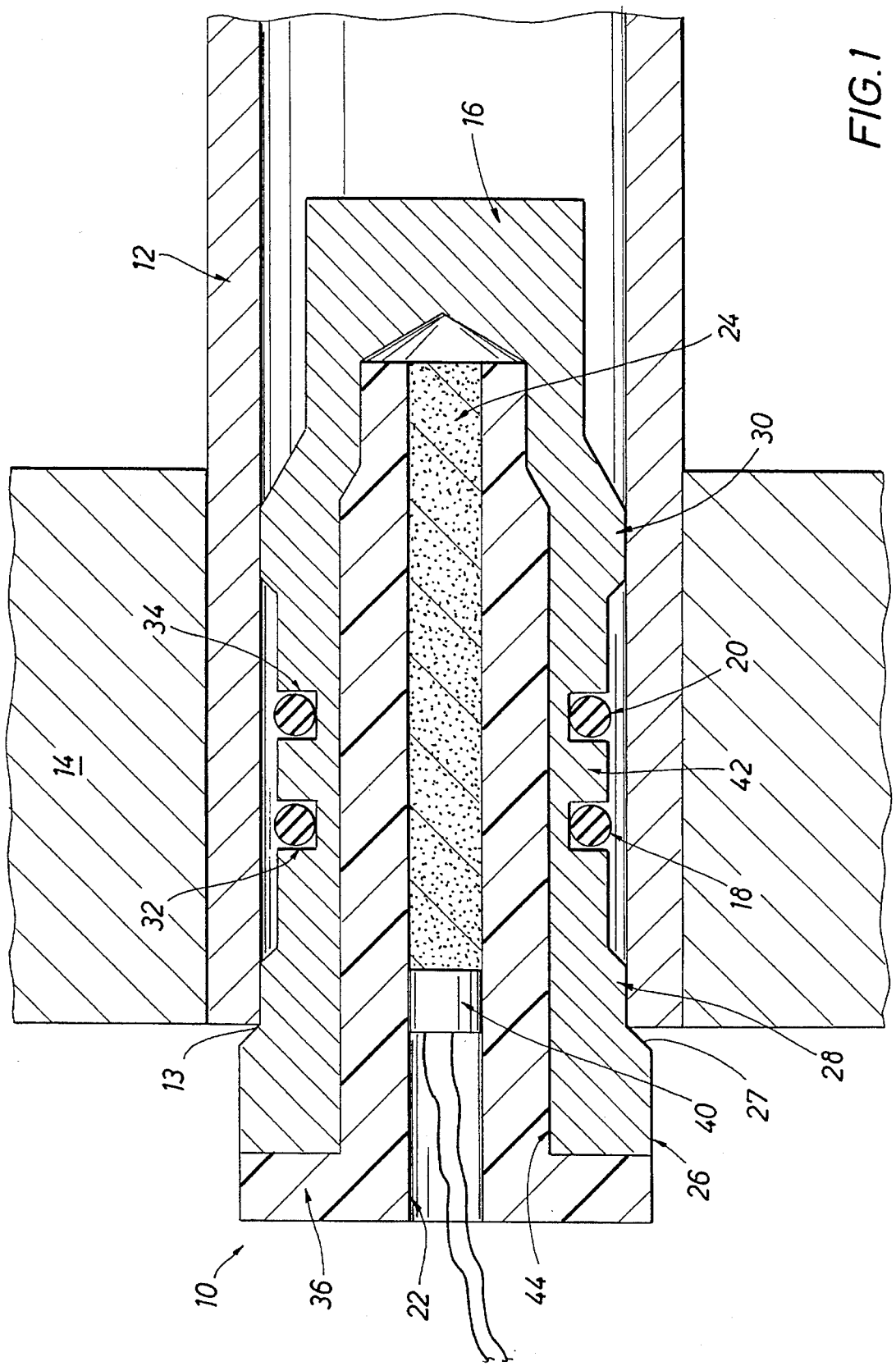
FIG. 1 a longitudinal sectional view of the plug of this invention inserted in an open end of a tube located in an opening in a tube sheet prior to detonation.

In FIG. 1, plug 10 is shown in the open end of heat exchanger tube 12 located in opening 13 in tube sheet 14. Plug 10 comprises generally cylindrical metallic body 16 of ductile material, such as brass. One or more resilient seal rings are located on the outside of body 16. In the embodiment shown, the seal rings are O-rings 18 and 20 located in circumferential grooves 32 and 34, respectively. The O-rings or other seal rings fit inside the circumferential grooves and do not extend above the body of the plug.

Section 26 of the body has a diameter that is larger than the opening in tube 12 to provide annular shoulder 27 for engaging the end of the tube. Shoulder 27 prevents plug 10 from moving into tube 12 when the explosive charge described below is detonated. Body 16 also has circumferential ridges 28 and 30 of a diameter slightly less than the inside diameter of the tube for centering plug 10 in the tube. The plug has a central cavity 44 in which pressure transmitting insert 36 is positioned. The insert is made of a dense material, such as rubber or plastic, and fits snugly in the cavity. Explosive charge 24 is located in longitudinal central opening 22 in insert 36. Detonator 40 is located in the opening adjacent the explosive charge.

Figure 2:
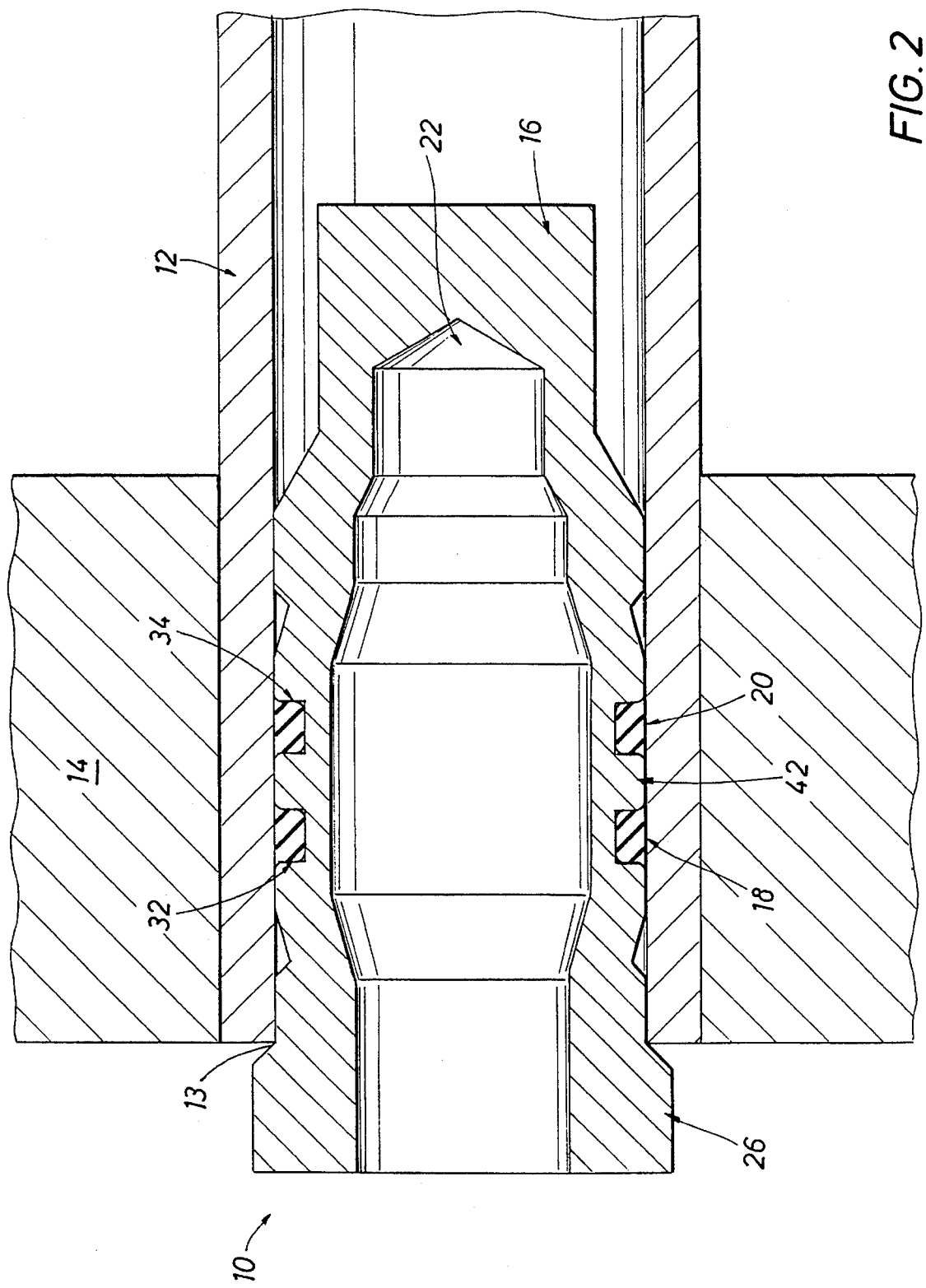
FIG. 2 is a longitudinal sectional view of the plug shown in FIG. 1 after detonation.

FIG. 2 shows plug 10 as it appears following detonation of explosive charge 24. Wall section 42 of the plug has been expanded into engagement with the inside wall of the tube with sufficient force to form a metal-to-metal seal with the tube. The walls of the circumferential grooves will flare out and away from the O-rings as a result of detonation, as shown in FIG. 2. The flaring out of the groove walls will allow O-rings 18 and 20 to also move into engagement with the tube to provide resilient seals between the tube and the plug. The resilient seals will prevent fluid from leaking past the plug should the metal-to-metal seal be broken due to expansion and/or contraction of tube 12.

Prior to inserting plug 10 into the open end of the tube, any liquids, grease, or other residues should be removed from the tube opening. After plug 10 is inserted in the tube, explosive charge 24 is detonated to produce a rapid, but progressive expansion of plug 10 in the direction of the detonation. Annular energy from explosive charge 24 is transmitted through insert 36 such that the outside surface of body 16 is expanded to form a seal with tube 12. However, the sealing engagement between body 16 and O-rings 18 and 20 may be broken when it becomes necessary to remove and replace leaky tubes. Plug 10 may be pried out of tube 12, or internally threaded for removal.

Explosive charge 24 is preferably pentaerythritoltetranitrate (PETN), although other explosive charges known to those skilled in the art may be used. The explosive charge may be detonated using methods known to those skilled in the art, such as electrically actuated explosive detonators. Exemplary of an electrically actuated explosive detonator is an exploding bridge wire. The explosive load required to expand thin wall section 42 of plug 10 into sealing engagement with tube 12 is calculated based upon the yield strength of the plug material, the wall thickness of this section of the plug, and the annular clearance between the outside diameter of the section of the plug, and the tube.

The commercial embodiment of the plug will have an outer diameter of approximately 0.870 inches and be suitable for sealing tubes having internal diameters of approximately 0.870 to 0.935 inches. The plug will be approximately 2.25 inches in length. The outside diameter of body 16 will be adjusted for tubes having internal diameters that are greater or less than the 0.870 to 0.935 inch range. Other commercial embodiments of the present invention may be prepared for tube sheet openings and tubes located in an opening in a tube sheet of varying sizes, and will be dependent upon the inner circumferance of the opening or the tube. Circumferential ridges 28 and 30 will be approximately 0.950 inches apart with circumferential grooves 32 and 34 evenly spaced between the ridges.

From the foregoing it will be seen that this invention is one well adapted to attain all of the ends and objects hereinabove set forth, together with other advantages which are obvious and which are inherent to the apparatus and structure.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A plug for sealing the open end of a tube located in an opening in a tube sheet of a heat exchanger comprising a generally cylindrical metallic body of ductile material for positioning in the open end of the tube, first and second circumferential grooves in the outside surface of the metallic body, said grooves having walls generally perpendicular to the longitudinal axis of the body and first and second resilient seal rings positioned in the grooves, the seal rings having a diameter less than the depth of the grooves so that the seal rings are protected as the body is positioned in the tube, a longitudinal opening in the body, and an explosive charge in the opening that when detonated will expand the body such that the walls of the grooves flare out and away from the seal rings to force the portions of the body on each side of the grooves into metal-to-metal sealing engagement with the tube and to force the resilient seal rings into sealing engagement with the tube between the metal-to-metal seals, thereby plugging the end of the tube.

2. The plug of claim 1 in which the first and second resilient seal rings are O-rings.

3. The plug of tube 1 in which a second metal-to-metal seal is formed between the open end of the tube and the metal-to-metal seal and a third metal-to-metal seal is formed between the metal-to-metal seal and the end of the body positioned in the tube.

4. A method of plugging a leaky metal tube in a heat exchanger tube bundle and tube sheet structure, wherein the open end of the tubes in the tube bundle extend through the tube sheet, said method comprising inserting a metallic plug device having an explosive charge inside the plug and first and second circumferential grooves on the outside of the metallic body for protecting first and second resilient seal rings positioned in the grooves as the body is positioned in the tube, and detonating the explosive charge to expand the plug such that the walls of the grooves flare out and away from the seal rings to force the portions of the body on each side of the grooves into metal-to-metal sealing engagement with the tube and to force the resilient seal rings into sealing engagement with the tube between the metal-to-metal seals.

* * * * *